July 9, 1968  C. M. JONES II  3,391,913
FLUID BED KILN
Filed Feb. 23, 1966  2 Sheets-Sheet 1
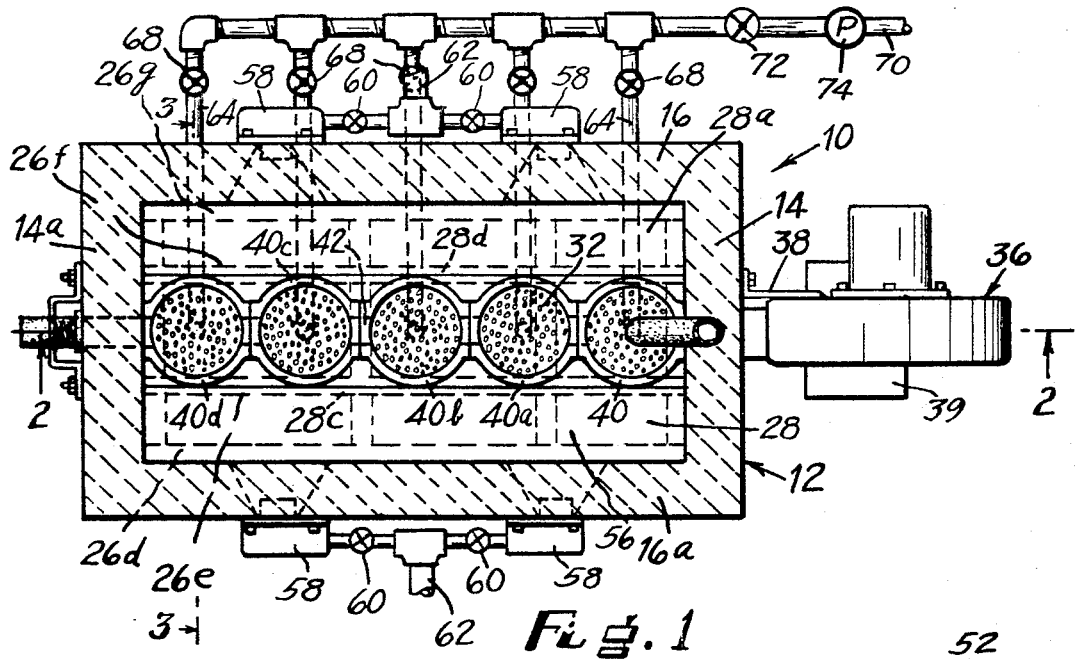
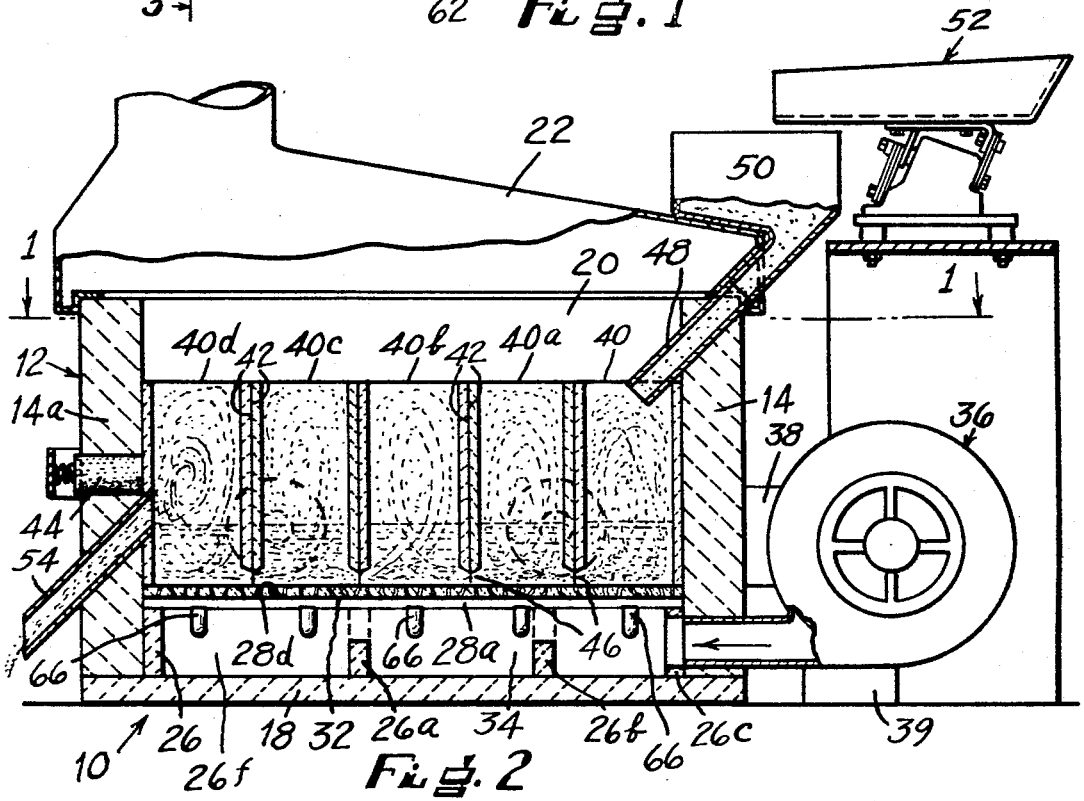
INVENTOR
CECIL M. JONES II
BY
Allan R. Redrow
ATTORNEY

INVENTOR
CECIL M. JONES II

United States Patent Office 3,391,913
Patented July 9, 1968

3,391,913
FLUID BED KILN
Cecil M. Jones II, Worcester, Mass., assignor to Norton Company, Worcester, Mass., a corporation of Massachusetts
Filed Feb. 23, 1966, Ser. No. 529,438
9 Claims. (Cl. 263—21)

ABSTRACT OF THE DISCLOSURE

An apparatus for continuously fluidizing, uniformly heat treating and transporting therethrough granular material having: a combustion chamber within which, can be heated by burners, a series of abutting vertically arranged tubes with interconnecting passages adjacent their ends supported on and around porous areas of a plate. The plate is supported above the bottom of the apparatus leaving a chamber through which either a fluidizing medium alone or/and a combustible mixture is forced from nozzles, through the porous areas and ignited all of which, simultaneously, fluidizes a bed of the granules in the tubes above the plate, heat treats the granules therein and transports the granules in a fluidized state through the series of tubes at the rate the particles are fed into an inlet at one end of the series of tubes out a discharge tube at the opposite end of the series of tubes.

This invention relates to apparatus for heat treating particulate material and more particularly to a continuous fluid bed kiln wherein particulate material is simultaneously transported and uniformly heat treated to high temperature in a faster and more efficient manner than heretofore known.

The art of heating granular material to temperatures above 1000° C. has progressed from the periodic kiln, wherein a static mass of grain is heated by thermal conductivity to a tunnel kiln whereby the moving kiln cars transport the static bed but the heat is still transmitted into the grain by thermal conductivity, to the modern rotary kiln, where the rotation of the kiln transports the grain and exposes it to the heat transfer mechanisms of thermal convection and radiation; and finally to the fluid bed kiln of this invention.

Briefly the invention comprises a kiln having a refractory lined enclosure with a combustion chamber in which one or more refractory tubes, positioned adjacent each other with one end of each tube resting on a porous refractory plate, may be heated. The tubes are filled with granular material to form a bed of predetermined depth and are adapted for passing grain from the interior chamber of one tube to that of the adjacent tube. Granular material to be treated is fed into the first tube or chamber of the series of tubes and discharged out of the same tube or the last of the series of tubes. Alternatively, either a fluidizing medium alone or an independently controlled variable mixture of combustible fuel and a fluidizing medium which supports combustion is forced through the porous areas and the bed of granular material in each of the tubes or chambers where it is ignited and the heat of combustion is rapidly and uniformly transferred to the particles in the bed of granular material.

The bed becomes fluidized which causes the bed of grain to flow and behave similar to boiling liquid. As the hot gas flows upwardly through the bed it first forms bubbles at the bottom just above the porous plate. The bubbles being less dense than the bulk density of the grain rise carrying some of the particulate grain with it to the top of the bed. Other grains then move downward to occupy the space vacated by the grains transported by the gas bubbles and thus produces a very rapid turbulent mixing of the grains. Since the fluidized bed of material acts as a liquid which seeks its own level, the treated grain automatically flows out the discharge part of the kiln at the same rate as the grain is being fed thereinto.

It is well known that when solid materials are subjected to a gaseous atmosphere a thin layer of gas molecules forms on the surface of the solid particle. The thickness of the layer of gas is the determining factor of how efficiently heat is transferred to the particles. This explains why the turbulence of a fluidized bed in which the particles and the gases are rapidly moving causes the rubbing of the particles against one another which continuously interrupts and reduces the thickness of the film, allowing a significant increase of heat to flow into the particles, thus achieving almost one hundred percent instantaneous heat transfer and infinite thermal conductivity throughout the fluid bed.

It is therefore one object of this invention to provide a high temperature low cost fluid bed kiln which can transfer heat uniformly into individual particles at a faster rate than heretofore obtainable.

Another object of the invention is to provide a high production fluid bed kiln which can be constructed in a relatively small space.

Another object is to provide a high production and high temperature fluid bed kiln wherein the material is automatically and simultaneously transported through the kiln as it is being heat treated thus eliminating the necessity of kiln furniture.

Still another object of the invention is to provide a variable and versatile fluid bed kiln which can be operated in various ways to produce the desired heat transfer and hence the desired characteristics in the particles being treated.

Other objects will be in part obvious or in part pointed out hereinafter.

In the accomapnying drawings:

FIG. 1 is a partial sectional plan view of the preferred embodiment of the invention taken on line 1—1 of FIG. 2;

FIG. 2 is a sectional view in elevation of the invention taken on line 2—2 of FIG. 1.

Figure 3:
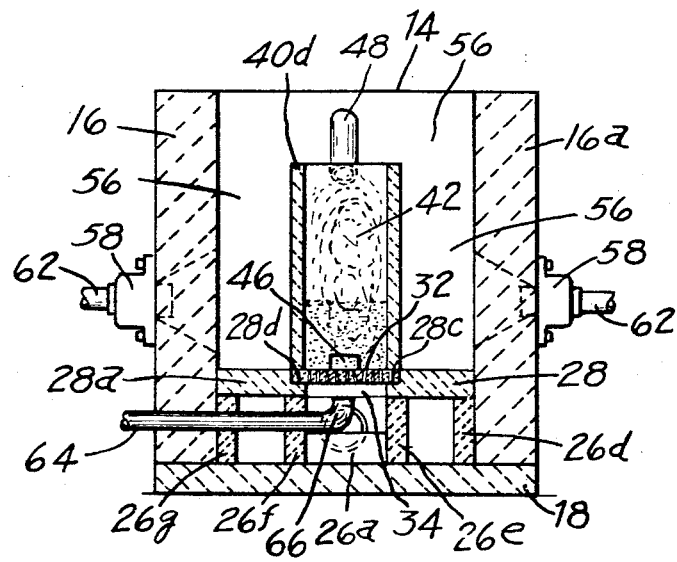
FIG. 3 is a sectional view in elevation taken on line 3—3 of FIG. 1.

Referring to the drawings the preferred form of the invention is a fluid bed kiln 10 which comprises; a high temperature refractory enclosure 12 having opposed side walls 14 and 14a and side walls 16 and 16a, a bottom wall 18 and an opening 20 at the top, opposite the bottom wall, communicating with the interior of an exhaust hood 22 supported on the top surfaces of the side walls 14 and 16.

Spaced from the bottom wall 18, by a plurality of longitudinally spaced refractory supporting blocks 26, 26a, 26b and 26c and transversely spaced supported block 26d, 26e, 26f, 26g, is a pair of refractory plates 28 and 28a which extend from the side walls toward the center of the enclosure 12. The plates 28 and 28a are spaced apart forming a central opening between them. On the edges of the plates adjacent the central opening are ledges 28c and 28d whereon and by which a porous refractory plate 32, having definite areas of porosity, is supported; thus forming a central chamber 34 between the bottom wall and the porous plate. The central chamber being enclosed at the sides by the transversely spaced supporting block 26e and 26f and the longitudinally spaced supporting blocks 26 and 26c.

At one end of the central chamber is an opening in the supporting block 26c which is in communication with the outlet end or nozzle of a variable speed blower 36 mounted in an opening extending through the side wall 14 of the enclosure 12. The blower 36 is supported by a bracket 38 fixed to the wall 14 and a block 39 supported by the floor. The purpose of the blower is to supply the desired volume of fluid for fluidizing the bed such as air, inert gas, or gases which support combustion.

Centrally situated on one of their ends, about the porous areas of the porous refractory plate 32 are a plurality of refractory tubes 40, 40a, 40b, 40c and 40d the wall of each of the tubes has opposed flat mating surfaces 42 held in contact with those of the adjacent tubes and the side wall 14 by a spring biased insulated type refractory plunger 44 slidably mounted in the opposite side wall 14a. The interior of the tubes 40-40d form a plurality of chambers in which a bed of granular material of predetermined height can be fluidized and heat treated. Each of the tubes has a passage 46 through the mating surface walls 42 which extends a predetermined distance, less than the depth of the bed, from the end of the tube resting on the porous plate 32, and through which the fluidized bed of granular material being treated may flow from one chamber to another.

Means for feeding the granular material into the fluid bed kiln is provided and comprises a fixed refractory tube 48 passing at an angle through the wall 14. The outlet end of the tube 48 extends into the chamber of the tube 40 and the inlet end is aligned in and communcation with a feed hopper 50 fixed to the exhaust hood 22. The feed hopper 50 can be adapted to feed granular material by gravity flow at the desired rate. However, a vigrating feeding mechanism 52 of any well-known commercially available type is preferred which can be supported to allow the material to be gradually fed at a constant rate into the hopper 50.

A discharge tube 54 made of refractory material is fixed at an angle in the opposite side wall 14a of the enclosure 12. The inlet end of the tube 54 extends into the chamber of the tube 40e at approximately the height of the bed of granular material whereby any increase in the depth or volume of the fluidized bed such as by feeding granular materials or increasing the volume of fluidizing medium causes a corresponding discharge rate of granular material from the tube 54.

Various means are provided for firing the kiln of the instant invention and thus heat treating the granular material to the desired temperature. One method provided is by externally heating the tubes in the combustion chamber 56 above the plates 28-28a in the enclosure 12. A plurality of fuel burners 58, which may be of any desired commercially available type such as gas, fuel oil, etc. and fixedly mounted on the side walls 16 and 16a at opposite sides of the tubes 40-40d. The burners 58 have individual control valves 60 for regulating and stopping the supply of fuel being delivered to the burners from a source of supply through the pipes 62. In this way the tubes may be heated to the desired temperature and the heat transferred to the granular material fluidized by the regulated volume of the fluidizing medium being delivered up through the porous plate into the chambers of the tubes 40.

A second method of firing the kiln is provided, and comprises a plurality of individual pipes 64 extending through the side wall 16 into the central chamber 34 wherein either raw fuel or a combustible mixture can be fed under pressure through individual nozzles 66 situated either below the porous plate or passing through the porous areas, directly into the fluidizing medium and the chambers within the tubes. By this method the heat of combustion is transferred directly to the granular material being treated and the bed fluidized at the same time. Also the temperature in each of the chambers can be varied independently of the other by regulating or shutting off the supply of fuel with individual control valves 68 in each of the pipes 64 connected to a main supply pipe 70 having a gate valve 72 and a variable speed but constant volume pump 74 for delivering the fuel at the desired volume. If it is found that additional fluidizing medium or fluid to support combustion is needed the variable speed blower 36 may be regulated to supply the deficiency.

A third method of firing the kiln is by combining and simultaneously using the firing methods described above which will increase the heat input, produce and maintain high temperatures, heat treat grain of larger size, increase the rate of production and reduce the heat treating time.

Following are practical examples of the results which can be achieved by firing the kiln in the various methods described above.

In each method, let us heat treat two grit sizes 16 grit (1200 microns) and 100 grit (147 microns). Heat transfer calculations tell us that we can theoretically heat a 16 grit particle of, for example, alumina in 2.5 seconds and a 100 grit particle of alumina in 0.0025 second. Both experimental and mathematical calculations of retention time in the five chamber kiln show the first grain through the kiln in four (4) minutes with only a trace of grains after an elapsed time of six (6) minutes. Thus there is no question that there is time to heat the particulate material to 1300° C. The only problem is whether we can produce enough heat input to raise the temperature of the grain according to the equation $Q=mc(t-t_1)$. Where Q is the total heat, $m$ is the mass of grain to be heated, $c$ is the specific heat of the mass to be heated, and $t-t_1$ is the temperature increase desired in the mass.

If the refractory tubes 40-40d are made of silicon carbide (SiC) with walls 1" thick, 30" high and with 12" diameter chambers all of which amount to 7.8 square feet of conduction area we can transmit 100 B.t.u.'s/hr.-sq. ft.-° F. from a 2820° F. combustion gas into a 2280° F. fluid bed. With the heat transfer surfaces as shown in the drawings and under these conditions then 140,000 B.t.u.'s/hr. can be moved through the walls of the tubes into the bed within the chamber.

*Example I*

If we fire the kiln by supplying heat only through the walls of the chamber with the burners 58 and the blower 36 forcing air at room temperature through the porous areas of the refractory plate to fluidize the bed, we achieve the following results:

| Grit Size | C.f.m./sq. ft. to Fluidize | Grain Heated to 2,280° F., lbs./hr. |
|---|---|---|
| 16 | 200 | ¹ 0 |
| 100 | 10 | 210 |

¹ Max. temperature of 1,200° F. at no through-put.

From the above data it can be seen that the above method of firing is advantageous only in heat treating the finer grit materials. Note also that both air and grain must be heated to 2280° F.

*Example II*

By supplying all of the heat input as raw fuel injected by the nozzles 66 through the porous plate into the bed of granular material and the blower 36 simultaneously supply fluidizing air and oxygen for combustion at the ratio of 10 volumes of air for one volume of natural gas, as fuel, (at 1000 B.t.u./cu. ft.). Then we achieve the following results:

| Grit Size | C.f.m./sq. ft. Fluidized | Max. B.t.u./hr. Input at 10/1 Ratio | Grain 3,280° F., lbs./hr. |
|---|---|---|---|
| 16 | 200 | 1,900,000 | 2,800 |
| 100 | 10 | 96,000 | 130 |

Note that the above data indicates that this method is more productive of the coarser grit materials.

Example III

By simultaneously utilizing the two previously described methods and data for firing the fluid bed kiln we achieve the following high ratio of production at lower cost.

| Grit Size | Total B.t.u./hr. input Thru Wall and Into Bed | Grain to 2,280° F., lbs./hr. | Natural Gas Fuel Cost per lb of Grain (cents) |
| --- | --- | --- | --- |
| 16 | 2,000,000 | 3,000 | .06 |
| 100 | 236,000 | 400 | .06 |

It will be noted that the last method of firing the kiln showed an increase in production of either the coarse or of the fine grit particles and is the most desirable of the three. However, with so many variables such as, the size and type of granular material to be treated, the fuel available, the contamination of the product, use of inert atmosphere etc.; it is very useful to be able to vary the method of firing the kiln. This is why the instant invention is so versatile and a great improvement over the fluid bed kiln of the past.

The operation of the kiln fired by any one of the methods described above is very simple. Granular material to be heat treated such as abrasive, refractory etc. is placed in or conveyed to the feeder 52 from which it is fed at a predetermined rate into the hopper 50. The particles of material flow downwardly by gravity into the heated chamber of the tube 40 until a bed of the particles is formed. The fluidizing medium being forced through the porous plate causes the volume of the bed to increase and produces a turbulent movement and rubbing of the particles within the heated chamber. The particles constantly rise and fall and work their way as a liquid which seeks its own level, through the passage 46 into the next and the other succeeding passages and chambers in which they receive similar treatment. When sufficient granular material is fed into the kiln, the level of the fluidized bed in each of the chambers remains on a common plane throughout the kiln. The level of the fluidized bed will vary for different materials but must be above the outlet or discharge tube 54 to provide the necessary head and constant flow of the heat treated material from the kiln. By controlling and providing a constant rate of infeed into the kiln the level or head of the bed and hence the rate of flow of material from the kiln automatically remains constant. Therefore, the time a particle of material spends in the kiln can be varied by controlling the feed rate and or the volume of the fluidizing medium both of which affects the level or head of the bed.

Although the preferred form of the invention has been disclosed as a series of tubes in a straight line within a rectangular chamber, it is to be understood that the kiln could be modified in various ways. For example, the kiln could be of hexagonal, round, square, or any other workable geometric shape and contain at least one or more tubes and chambers necessary to properly heat treat the various kinds of granular material available.

The refractory tubes may be arranged adjacent one another within the kiln in various patterns, such as, offset, wave, curve, square, circular and hexagonal, and may be formed integral with the enclosure to form the heating chamber. When only one tube or chamber is provided, the inlet or feeding tube and the outlet on discharge tube can be located and arranged in the single tube in the relative manner shown in the drawings.

Various means and fuels may be used to fire the kiln, for example, natural and manufactured gases, pulverized solid fuels, liquid fuel, and/or electric resistance heating elements as shown in U.S. Patents 2,670,425 and 2,670,426 granted to H. Nathan Stone.

The fluidizing medium for high temperature kiln should be a gas: including air, combustion products, nitrogen, argon, helium, or any other gas stable at high temperature that may be required to give the particulate material the desired properties.

In some applications the fluidizing medium may even be preheated in the manner taught by H. Nathan Stone in the above mentioned U.S. Patents and then forced through the porous plate 32 and the bed to heat treat the particulate material. If desired the gas exhausting through the hood from the kiln may be recirculated through the kiln by conducting the exhausting gas to the intake side of blower 36 where it can if desired be mixed with another fluid and recirculated.

The selection of refractory materials for building the kiln is important but depends upon the temperature desired, the properties of the material being treated, the purity of product desired, the errosive and contaminating affect of the various combustion and fluidizing gases on the materials as well as the product. Therefore, any of the well-known refractory materials, or combination of them, may be used depending upon the application.

For example, sintered alumina is a good refractory material from which to construct the various refractory components of the kiln when the product desired is relatively pure alumina particles. Likewise, zirconia, magnesia, silicon carbide for relatively pure products of these materials.

There are applications where a slight contamination of the particles is unobjectionable and a kiln could be constructed of any one or a combination of refractory materials suitable to heat treat a variety of granular material. Many of the stable gases such as nitrogen, helium, and argon, may be used to prevent contamination of the products when used as the fluidizing medium. In other applications air, combustible products, and other gases may be used when a product with certain properties is desired and/or slight contamination is unobjectionable.

It will thus be seen that there has been provided by this invention a fluid bed kiln in which the various objects hereinbefore set forth together with many practical advantages are successfully achieved. As there are many possible embodiments and changes which might be made in the above invention, it is to be understood that all matter hereinbefore set forth or shown in the accompanying drawing is to be interpreted as illustrative and not in a limiting sense within the scope of the appended claims.

I claim:

1. A fluid bed kiln for heat treating granular material, which comprises:
   - a refractory enclosure having side and bottom walls;
   - a refractory plate, having a central opening, spaced from the bottom wall and extending to the side walls thereby forming a central chamber therebetween;
   - a porous refractory member situated in the central opening in the refractory plate;
   - a refractory tube situated on end about the porous member;
   - means for conveying granular material to be treated into the tube at a predetermined feed rate and to provide a bed of the granular material of uniform depth above the porous plate;
   - means for allowing the granular material to discharge from the tube;
   - means for supplying a predetermined constant volume of a fluid medium into the central chamber, through the porous plate into the bed of granular material whereby the bed of granular material being treated is simultaneously fluidized and automatically transported through the kiln at the predetermined feed rate;
   - means for heating the refractory tube to transfer heat to the granular material within the tube;
   - means for supplying a combustible fuel through the porous plate into the interior of the tube, and the fluidized bed of granular material wherein the mixture is burned to produce hot gases of combustion and transfer heat therefrom to the granular material; and means for exhausting the gases of combustion from the enclosure.

2. A fluid bed kiln for heat treating granular material, which comprises:
- a refractory enclosure having side and bottom walls;
- a refractory plate, having a plurality of adjacently spaced porous sections therein spaced from the bottom wall thereby forming a central chamber therebetween;
- a plurality of refractory tubes situated on one end with the wall of each tube about one of the porous sections, said tubes connected in series and having passages in the walls of adjacent tubes to permit the passage of granular material from one to the other at said end;
- means for conveying granular material to be treated into the first of said series of tubes at a predetermined feed rate and to provide a bed of granular material of uniform depth above the porous sections in the refractory plate;
- means for allowing the granular material to be discharged from the last of said series of tubes;
- means for supplying a predetermined constant volume of a fluid medium into the central chamber through the porous sections and the bed of granular material whereby the bed of granular material is simultaneously fluidized and automatically transported through the series of tubes at the predetermined feed rate;
- means for heating the tubes to transfer heat to the granular material within the tubes;
- means for supplying a combustible fuel through the porous sections into the fluidizing medium and the fluidized bed of granular material within the tubes wherein the fuel is burned producing hot gases of combustion and transfer heat therefrom to the granular material; and
- means for exhausting the gases of combustion from the enclosure.

3. A fluid bed kiln for heat treating granular material according to claim 2 wherein the means for heating the tubes comprises:
- a plurality of fuel burners protruding through the side walls into a combustion chamber about the tubes within the enclosure above the refractory plate.

4. A fluid bed kiln for heat treating granular material according to claim 2 wherein the means for supplying combustible fuel into the fluidized bed comprises:
- a main conduit connected to a source of fuel under a variable constant pressure;
- a plurality of pipes extending from the main conduit into the central chamber with an outlet end of each of said pipes directed to deliver fuel through each of the porous sections into the fluidized bed of granular material; and
- means for varying the volume of fuel delivered to the plurality of pipes and individually to each of the porous sections and tubes.

5. A fluid bed kiln for heat treating granular material according to claim 2 wherein the series of tubes are resiliently held in contact with one another.

6. A fluid bed kiln for heat treating granular material according to claim 2 wherein the means to supply a predetermined constant volume of the fluid medium is a constant volume but a variable speed blower connected to a source of fluid medium.

7. A fluid bed kiln for heat treating granular material according to claim 2 wherein the means for conveying granular material into the first of said series of tubes comprises:
- a variable, constant volume feed mechanism adjacent the enclosure;
- a hopper between the feed mechanism and the enclosure and into which the granular material is fed by the feed mechanism; and
- a refractory conductor having a passage connected to the hopper and extending downwardly into the enclosure and tube above the bed of granular material.

8. A fluid bed kiln for heat treating granular material according to claim 2 wherein the means for allowing the discharge of granular material from the last of said series of tubes, comprises:
- a refractory conductor having an inlet passage extending from within the tube through the side wall of the enclosure to an outlet end, exteriorly of kiln.

9. A fluid bed kiln for heat treating granular material according to claim 2 wherein the means for exhausting the gases of combustion comprises:
- a hood, having an outlet pipe, on and supported by the side walls of the enclosure above the series of tubes.

References Cited

UNITED STATES PATENTS

| | | |
|---|---|---|
| 2,629,938 | 3/1953 | Montgomery. |
| 2,797,908 | 7/1957 | Zubrzycki _____ 263—21 |
| 3,192,644 | 7/1965 | Knibbs et al. _____ 263—21 XR |
| 3,250,521 | 5/1966 | Sergent _____ 263—21 |

FOREIGN PATENTS

| | | |
|---|---|---|
| 139,594 | 9/1960 | U.S.S.R. |

FREDERICK L. MATTESON, Jr., *Primary Examiner.*

A. D. HERRMANN, *Assistant Examiner.*